United States Patent Office
3,144,489
Patented Aug. 11, 1964

3,144,489
PROCESS FOR THE PRODUCTION OF ALKYLATED ORGANIC SULPHUR COMPOUNDS
Willi Hahn, Cologne-Stammheim, Germany, assignor to Farbenfabriken Bayer Aktiengesellschaft, Leverkusen, Germany, a corporation of Germany
No Drawing. Filed Apr. 12, 1961, Ser. No. 102,384
11 Claims. (Cl. 260—609)

The present invention relates to a new process for the production of alkylated organic sulphur compounds, using specific catalysts.

It is known that olefines can be added to organic sulphur compounds which contain a free sulphhydryl group. This addition is either carried out in the presence of concentrated mineral acids, peroxides or sulphur, or by activation with ultra-violet light. However, when working in the absence of catalysts and without any activation with ultra-violet light, there is no addition or only a very slight addition (with regard to the above processes see: Berichte der Deutschen Chemischen Gesellschaft, vol 38 (1905), page 649; Journal of the American Chemical Society, vol. 60 (1938), pages 2452 and 2731; U.S. Patent No. 2,392,294; Houben-Weyl, "Methoden der organischen Chemie," vol. 9, 4th edition, page 120).

It is also known that $\beta$-substituted esters are obtained by reacting $\alpha,\beta$-unsaturated esters with aliphatic mercaptans in the presence of basically active substances, such as also alkali metal mercaptides, by addition to the double bond. The catalysts used are in each case strongly basic and the addition always takes place in accordance with Markownikow's rule.

According to Example 1 of German patent specification No. 891,391, the $\beta$-ethyl mercapto-n-methyl butyrate is obtained from methyl crotonate and ethyl mercaptan in the presence of sodium ethyl mercaptide.

It is an object of the present invention to provide a new process for the production of alkylated organic sulphur compounds. Another object of the invention is to make it possible by use of special catalysts to control the reaction between the olefines on the one hand and the mercaptans on the other hand.

Finally, another object is to be able to effect the addition of mercaptans to the olefines at will in accordance with Markownikow's rule or in opposition to this rule. Other objects will be apparent from the following description and the examples.

It has now surprisingly been found that olefine can be reacted with mercaptans very smoothly to form corresponding alkylated sulphur compounds if the reaction is carried out in the presence of metal mercaptides of the metals of the first to third group of the Periodic System of the elements. By suitably choosing the metals, it is possible to obtain an addition of the mercaptan to the olefine, either in accordance with or in contradistinction to the rule of Markownikow.

The course of the reaction must be considered as extremely surprising. On the basis of the state of the art, it was to be expected that with the reaction of compounds containing sulphhydryl groups with olefines in the presence of alkali metal mercaptides, the addition to the double bond would take place in accordance with Markownikow's rule, but this is not the case. When using alkali metal mercaptides, the addition to the double bond in the process according to the invention is in fact contrary to the Markownikow's rule. The mercaptides of metals of the second and third groups, which can be used according to the invention are compounds which are very slightly basic or neutral. With these compounds, an addition in accordance with Markownikow's rule is obtained, and this is likewise surprising, since these substances do not have a strongly basic character, as is required in the teaching of German patent specification No. 891,391.

By comparison with the process according to German patent specification No. 891,391, the process according to the invention has the advantage that the addition can be effected selectively in accordance with or contrary to Markownikow's rule. Furthermore, olefines, i.e. hydrocarbons with a non-activated double bond are reacted.

Sulphur compounds which are suitable for the process are the mercaptans of the aliphatic, aromatic and heterocyclic series, for example dodecyl mercaptan, thiophenol, p-thiocresol or 2-mercaptobenzthiazol. It is also possible to use those mercaptans which are substituted by other functional groups, for example by halogen atoms or alkoxy, nitro or amino groups. However, no carbonyl or sulphonic acid groups should be present in the molecule, since these can damage the catalyst due to double reactions.

As olefinic components, unsaturated compounds of the aliphatic, alicyclic or aralphatic series with olefinic double bonds are generally suitable and typical compounds of this type are ethylene, propylene, isobutylene, nonylene, cyclohexene and styrene.

The catalysts effective for the process are mercaptides of metals of the first to third groups of the Periodic System of the elements for example of sodium, potassium, magnesium or aluminium. The mercaptan to be alkylated is preferably also used as mercaptide former, but if necessary a mercaptide of another mercaptan can be employed.

The mercaptides can be prepared by various processes known per se, such as by direct reaction of the metal with the mercaptan, by neutralisation of a metal hydroxide with a mercaptan or by metal exchange by means of an organometallic compound.

The quantity of the mercaptide to be used as catalyst depends on the particular relationships with the individual reaction components. Generally speaking, mercaptides are used in quantities which correspond to 0.1 to 10% of the metal concerned, related to the sulphur compound to be alkylated. It is particularly advantageous to use about 0.5 to 3% thereof.

The process according to the invention is carried out by adding to the mercaptide catalyst to the thio compound to be alkylated and then introducing the olefinic component at elevated temperatures. If it is desired to react those olefines which are gaseous at the reaction temperature, then the reaction must take place in a pressure vessel and provision must be made for complete reaction by occasionally adding olefine under pressure. If the reaction components have a sufficiently high boiling point, the reaction can take place in an open vessel. If solid mercaptans are to be reacted below the melting point, it may be advantageous to add a solvent. Examples of suitable solvents are hydrocarbons of the aliphatic, hydroaromatic and aromatic series; however, any other desired and conventional solvents can be used, provided they are neutral with respect to the catalyst. In particular, an excess of the olefine to be reacted can serve as solvent. In one particular embodiment of the process, the catalyst is formed in the reaction mixture itself. In this case, the metal or a suitable compound thereof is added to the mercaptan and the formation of the mercaptide is allowed to proceed at elevated temperature. The reaction products thereby formed (for example hydrogen from the reaction between the metal and the mercaptan) can either remain in the reaction mixture or be removed before introducing the olefinic component.

The process can also be conducted continuously. When operating in this manner, the mercaptan (containing the catalyst) and the olefinic component are introduced by means of separate proportioning devices into the reaction chamber and the corresponding quantity of reaction product is withdrawn at another point of the reaction vessel, is then cooled and if necessary expanded by way of a pressure valve.

The most favourable reaction temperature differs for the different reactants. Generally speaking, a temperature range of from 80–300° C. and especially from 100–230° C. is used, but in certain cases lower or even higher temperatures can be advantageous.

The ratio between the reactants depends on the chemical composition thereof. Generally, 1 mol of olefine is used per mol of mercaptan, but in order to produce good conversions, an excess of the unsaturated component is employed, for example with a molar ratio of 2:1.

For working up the reaction products, the catalyst is first of all decomposed by treatment with aqueous acids and the organic reaction mixture formed is purified by suitable known processes, for example by fractional distillation or by steam distillation.

When using the process according to the invention, predominantly the alkyl thioethers of the initial mercaptans are obtained, that is to say, there is an addition of the sulphhydryl group to the olefinic double bond. In addition, alkylation can also take place on the carbon atom. For example, with the action of propylene on thiophenol or p-thiocresol in the presence of the corresponding aluminum mercaptides, thioethers isopropylated in the nucleus are obtained as well as aryl isopropyl sulphides. Furthermore, the constitution of the alkylation products depends largely on the metal of the catalyst. Thus, there is a difference in principle between the alkali metals and aluminum, in that the mercaptides of the former basically initiate addition processes opposed to the Markownikow rule, whereas the thioethers to be expected according to Markownikow are formed in the presence of aluminium mercaptides.

The process according to the invention enables alkyl thio compounds to be produced in a simple manner. Such compounds were formerly obtainable either by double reactions of thiols with alkyl halides or alcohols, or by reaction with olefines in accordance with the processes initially referred to. The main advantage of the process according to the invention over the known processes is that the alkylation can take place with olefines which are readily obtainable industrially and in the presence of metal mercaptide catalysts, which are extremely easy to produce, are convenient to handle and can be easily removed after the reaction. In addition, the choice of the metal permits the selective production of specific isomers.

The alkylated sulphur compounds which are readily obtainable in accordance with the process are valuable antioxidants and stabilisers, and quite generally additives for fuels and mineral oils, auxiliaries for natural and synthetic rubber and synthetic resins. They can moreover be used as intermediate products for the production of compounds for the purposes mentioned above, and also for the production of medicines, pest-control agents and dyestuffs.

The present invention is further disclosed in the following example, which are illustrative but not limitative thereof.

*Example 1*

200 parts by weight of thiophenol are heated with 3 parts by weight of aluminum chips in an autoclave equipped with a stirrer mechanism, the aluminum dissolving with the evolution of hydrogen. The hydrogen formed produces a superatmospheric pressure in the reaction vessel. At 280–300° C., ethylene is forced in to a pressure of 200 atm. The reaction starts immediately with consumption of ethylene and stops after about 3 hours (total absorption of 75 parts by weight of ethylene). The reaction product is treated with dilute sulphuric acid to destroy the catalyst and is then fractionally distilled in vacuo after separation from the aqueous phase. Ethyl phenyl sulphide (B.P.$_{50}$=117° C.) is obtained in a yield of 50%, related to the crude product, and ethyl-(2-ethyl phenyl)-sulphide (B.P.$_{50}$=144° C., PdCl$_2$ addition compound, M.P.=155 to 156° C.) with a yield of 18%, related to the crude product.

*Example 2*

200 parts by weight of thiophenol are reacted with 3 parts by weight of aluminium chips, as in Example 1. After termination of the formation of aluminium thiophenolate, propylene is pumped in to a pressure of 40 atm. at 200° C. The reaction proceeds very quickly and practically stops after absorption of 70 parts by weight of propylene. The reaction product is worked up as in Example 1. The crude product consists of 77% of isopropyl phenyl sulphide (B.P.$_{50}$=120° C.) and 13% of isopropyl-(isopropylphenyl)-sulphide. (B.P.$_{50}$=150° C.)

*Example 3*

3 parts by weight of metallic sodium are introduced in portions at 100° C. in a nitrogen atmosphere into 200 parts by weight of thiophenol in a stirrer-type apparatus equipped with a reflux condenser, sodium thiophenolate being immediately formed. The reaction product is treated in the autoclave at 250° C. with propylene (50 atm.); 50 parts by weight of olefine are consumed over a period of 4 hours. Working up in accordance with Example 1 yields 20% (related to the crude product) of unmodified thiophenol and 72% (related to the crude product) of n-propyl phenyl sulphide (B.P.$_{50}$=133° C.).

*Example 4*

174 parts by weight of p-thiocresol and 2.6 parts by weight of coarse aluminium powder are heated in a stirrer-type autoclave to 180° C. and after completion of the formation of mercaptide, isobutylene is pumped in to a pressure of 200 atm. After stirring for 3 hours at 200° C., 115 parts by weight of olefine have been consumed. After usual working up, the reaction product consists of 20% of low-boiling hydrocarbons and 70% of tert. butyl-p-tolyl sulphide (B.P.$_{50}$=142° C., PdCl$_2$ addition compound M.P.=103° C.).

*Example 5*

200 parts by weight of p-thiocresol are reacted with 2.5 parts by weight of potassium by the process described in Example 3 and the mixture is treated at 250° C. with isobutylene at a pressure of 100 atm. After absorption of 100 parts by weight of olefine over a period of 5 hours, working up is carried out in the usual manner. In addition to 10% of p-thiocresol, the reaction product contains 50% of i-butyl-p-tolyl sulphide (B.P.$_{50}$=157° C., PdCl$_2$ addition compound M.P.=105 to 107° C.) and products of higher boiling point.

*Example 6*

200 parts by weight of dodecyl mercaptan and 2 parts by weight of sodium are heated to 80–100° C. until all of the metal has dissolved with evolution of hydrogen. The product is introduced into a stirrer-type autoclave and treated at 200 to 250° C. with isobutylene up to a pressure of 180 atm. The autoclave is cooled after 4 hours, the pressure is released and the reaction mixture (240 parts by weight) is treated with dilute sulphuric acid. Upon fractional distillation, 23% of dodecylmercaptan, 34% of isobutyl dodecyl sulphide (B.P.$_{10}$=177° C.) and 10% of a more highly alkylated product (B.P.$_{10}$=182° C.) are obtained as well as a small quantity of hydrocarbons.

*Example 7*

200 parts by weight of thiophenol and 2 parts by weight of magnesium chips are heated in a stirrer-type autoclave to 200° C. until the formation of mercaptide, which can be seen from the hydrogen pressure being set up, is completed. Liquid propylene is then pumped to a pressure of about 200 atm. and stirring takes place for 4 hours at 200° C. With the usual working up of the reaction mixture, 40% of the thiophenol which is used are recovered. The only alkylation product formed is n-propyl phenyl sulphide (B.P.$_{50}$=133° C.).

Example 8

165 parts by weight of thiophenol, 13 parts by weight of aluminium ethyl mercaptide and 189 parts by weight of industrial tripropylene are heated in a stirrer-type apparatus equipped with a reflux condenser under a nitrogen atmosphere for 4½ hours with strong reflux. The reaction product is decomposed with dilute sulphuric acid and fractionally distilled in vacuo. 8% of the thiophenol employed is unchanged, 92% is converted into nonyl phenyl sulphide (B.P.$_{10}$=150 to 154° C.; PdCl$_2$ addition compound, decomposition point 325° C.).

Example 9

The aluminium thiophenolate suspension prepared in usual manner from 165 parts by weight of thiophenol and 2 parts by weight of aluminium is mixed with 135 parts by weight of cyclohexene and stirred in an autoclave for 4 hours at 200° C. After the decomposition of the catalyst, a reaction product is obtained which consists of 5% of thiophenol and 85% of cyclohexyl phenyl sulphide (B.P.$_{10}$=144° C., cyclohexyl phenyl sulphone M.P.=78 to 79° C.).

Example 10

200 parts by weight of 2-mercaptobenzthiazole, 20 parts by weight of sodium-2-mercaptobenzthiazole and 200 parts by weight of benzene are stirred for 5½ hours in an autoclave at 260 to 270° C. with propylene under a pressure of 100 atm. The reaction mixture (490 parts by weight) is finally stirred with dilute sulphuric acid and the solvent is removed by distillation. The solid part of the distillation residue is filtered off. It consists of unmodified starting material (30 to 40%). The liquid fractions contain, in addition to a small quantity of benzthiazole alkylation products of mercaptobenzthiazole; mainly a 2-propyl mercaptobenzthiazole (B.P.$_{20}$=178° C.).

Example 11

An aluminium thiophenolate-thiophenol mixture prepared from 165 parts by weight of thiophenol and 8.5 parts by weight of aluminium triethyl is placed in an autoclave and, after adding 168 parts by weight of isobutylene, stirred for 3 hours at 90 to 100° C. After removal of the catalyst, the reaction product which is obtained consists of 98% of tert. butyl phenyl sulphide (B.P.$_{50}$=123° C., sulphone M.P.=98 to 99° C.).

Example 12

202 parts by weight of dodecyl mercaptan and 2 parts by weight of sodium are stirred at 40 to 50° C. until all the metal has been reacted to form the mercaptide. 104 parts by weight of styrene are then introduced dropwise at 150° C. into the resulting suspension. After stirring for another 3 hours at 170° C., the reaction product is decomposed with water, adjusted with dilute sulphuric acid to a pH value of 7 and the organic layer is separated out (298 parts by weight). With vacuum distillation, it is mainly dodecyl(β-phenyl ethyl) sulphide; B.P.$_{.5}$=215 to 220° C., which is obtained, as well as some unmodified dodecyl mercaptan and styrene.

Analysis for C$_{20}$H$_{34}$S (306.47) — calculated: C, 78.38%; H, 11.18%; S, 10.44%. Found: C, 78.47%; H, 11.22%; S, 10.45%.

The sulphone melts at 72 to 73° C.

Example 13

200 parts by weight of p-chlorothiophenol and 2 parts by weight of aluminium chips are reacted at 200° C. after having been activated with some mercuric chloride. Propylene is forced in to a pressure of 100 atm. into the reaction product in a stirrer-type autoclave at 200 to 220° C. After 5 hours, the reaction is completed. The mixture is stirred with dilute sulphuric acid to remove the catalyst and the organic layer is subjected to distillation. In addition to higher alkylation products the isopropyl-(p-chlorophenyl) sulphide is obtained as a colourless oil having a B.P.$_{50}$=133° C. (sulphone M.P.=88 to 89° C.).

Example 14

158 parts by weight of thiophenol and 2.5 parts of weight of calcium chips, corroded beforehand with some methanol, are heated in an autoclave and while stirring to 200° C. until the hydrogen pressure remains constant. The autoclave is then charged with 96 parts by weight of isobutylene by means of a proportioning pump. After stirring for 4 hours at 200° C., the autoclave is cooled and the reaction product (200 parts by weight) is distilled in vacuo after treatment with dilute hydrochloric acid. The mixture consists of 10% of unreacted thiophenol, 20% of tert. butyl phenyl sulphide (B.P.$_{50}$=124° C.; sulphone M.P.=98 to 99° C.) and 70% of isobutyl phenyl sulphide (B.P.$_{50}$=141° C.).

I claim:

1. Process for producing alkylated organic sulfur compounds which comprises reacting a member selected from the group consisting of thiophenol, p-thiocresol, p-chlorothiophenol, 2-mercapto-benzthiazol, and dodecylmercaptan with an olefin selected from the group consisting of ethylene, propylene, isobutylene, tripropylene, styrene and cyclohexane in the presence of an aluminium mercaptide as catalyst, said contacting being effected at a temperature within the range of about 80° C. to about 300° C., and recovering the alkylated organic sulfur compound thereby formed.

2. Process according to claim 1, which comprises effecting said reaction at a temperature within the range of about 80 to about 300° C.

3. Process according to claim 1, which comprises effecting said reaction using about 1 mol of olefin per mol of mercaptan.

4. Process according to claim 1, which comprises effecting said reaction using an excess of olefin with respect to mercaptan.

5. Process according to claim 1, wherein said mercaptan is thiophenol, said olefin is propylene and said catalyst is aluminum thiophenolate.

6. Process according to claim 1, wherein said mercaptan is thiophenol, said olefin is ethylene and said catalyst is aluminum thiophenolate.

7. Process according to claim 1, wherein said mercaptan is p-thiocresol, said olefin is isobutylene and said catalyst is aluminum p-thiocresolate.

8. Process according to claim 1, wherein said mercaptan is thiophenol, said olefin is tripropylene and said catalyst is aluminum ethyl mercaptide.

9. Process according to claim 1, wherein said mercaptan is thiophenol, said olefin is cyclohexene and said catalyst is aluminum thiophenolate.

10. Process according to claim 1, wherein said mercaptan is thiophenol, said olefin is isobutylene and said catalyst is aluminum thiophenolate.

11. Process according to claim 1, wherein said mercaptan is p-chlorothiophenol, said olefin is propylene and said catalyst is aluminum p-chlorothiophenolate.

References Cited in the file of this patent

UNITED STATES PATENTS

| | | |
|---|---|---|
| 2,163,176 | Keyssner | June 20, 1939 |
| 2,390,099 | Harmon | Dec. 4, 1945 |
| 2,454,409 | Schulze | Nov. 23, 1948 |

OTHER REFERENCES

Reid: Organic Chemistry of Bivalent Sulfur, vol. II, p. 35 (1960), Chem. Pub. Co.

UNITED STATES PATENT OFFICE
CERTIFICATE OF CORRECTION

Patent No. 3,144,489                              August 11, 1964

Willi Hahn

It is hereby certified that error appears in the above numbered patent requiring correction and that the said Letters Patent should read as corrected below.

Column 1, line 48, for "olefine" read -- olefines --; column 2, line 44, strike out "to", first occurrence; column 3, line 61, for "example" read -- examples --; column 4, line 19, for "150° C." read -- 151° C. --; column 6, line 11, for "of", second occurrence, read -- by --; line 31, for "cyclohexane" read -- cyclohexene --.

Signed and sealed this 29th day of December 1964.

(SEAL)
Attest:

ERNEST W. SWIDER                              EDWARD J. BRENNER
Attesting Officer                                  Commissioner of Patents